United States Patent
Huang et al.

(10) Patent No.: US 10,224,738 B2
(45) Date of Patent: Mar. 5, 2019

(54) ENERGY HARVESTING SYSTEM WITH INDIRECT POWER TRANSMISSION AND POWER DISTRIBUTION METHOD

(71) Applicant: NATIONAL CHENG KUNG UNIVERSITY, Tainan (TW)

(72) Inventors: Peng-Chang Huang, Tainan (TW); Hsuan-Ju Chen, Tainan (TW); I-Hsiang Wang, Tainan (TW); Yi-Wei Huang, Tainan (TW); Tai-Haur Kuo, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 362 days.

(21) Appl. No.: 15/045,507

(22) Filed: Feb. 17, 2016

(65) Prior Publication Data

US 2017/0237282 A1    Aug. 17, 2017

(51) Int. Cl.
*H02J 7/34*    (2006.01)
*H02J 7/35*    (2006.01)
*H02J 3/38*    (2006.01)

(52) U.S. Cl.
CPC ............. *H02J 7/345* (2013.01); *H02J 3/385* (2013.01); *H02J 7/35* (2013.01)

(58) Field of Classification Search
None
See application file for complete search history.

(56) References Cited

U.S. PATENT DOCUMENTS

| 9,343,967 B2* | 5/2016 | Shao | H02M 3/158 |
| 9,541,941 B2* | 1/2017 | Ramorini | H02J 50/00 |
| 2011/0012551 A1* | 1/2011 | Tseng | H02J 7/0065 320/101 |
| 2015/0236551 A1* | 8/2015 | Shearer | H02J 17/00 307/104 |

* cited by examiner

*Primary Examiner* — Jared Fureman
*Assistant Examiner* — Joel Barnett
(74) *Attorney, Agent, or Firm* — patenttm.us

(57) ABSTRACT

A power distribution method is applied to control an energy harvesting system that includes an ambient energy source, an energy storage, a power converting circuit and a control unit. With the power distribution method, the excess power generated by the ambient energy source is transmitted to charge the energy storage through an indirect power flowing path, or the load side is powered by the energy storage through another indirect power flowing path. Therefore, the number of inductor switches of the power converting circuit can be reduced to mitigate switching loss and ensure higher power conversion efficiency.

3 Claims, 16 Drawing Sheets

ENERGY HARVESTING SYSTEM WITH INDIRECT POWER TRANSMISSION AND POWER DISTRIBUTION METHOD

BACKGROUND OF THE INVENTION

1. Field of the Invention

The present invention relates to an energy harvesting system and a power distribution method, and more particularly to an energy harvesting system using a simplified architecture and fewer switching elements to obtain high power conversion efficiency.

2. Description of the Prior Art

With reference to FIG. 10 in a conventional energy harvesting system, a low power consumption load such as a wireless sensor network system is suitably powered by ambient energy sources that generate small amount of electrical power. The ambient energy may result from ambient light, temperature difference, vibration and etc. An energy storage such as a secondary battery is preferably applied in the energy harvesting system to provide extra energy to the load under a heavy load situation to cover deficiency of the ambient energy. Contrary to the heavy load situation, the energy storage can obtain and store surplus energy from the ambient energy source when the load is under a light load situation. Therefore, power distribution among the ambient energy source, the energy storage and the load is a considerably important issue.

FIG. 11A shows a power flow chart of one type of energy harvesting system having two converters Z1 and Z2. The first converter Z1 converts the energy of the ambient energy source and stores the energy in an energy storage. The second converter Z2 converts the energy in the energy storage and outputs the converted energy to the load.

With reference to FIG. 11B, a two-stage conventional DC to DC energy harvesting system is proposed to implement the power flow of FIG. 11A. The two-stage conventional DC to DC energy harvesting system for converting the ambient energy includes a first converter Z1 and a second converter Z2 connected sequentially. The first converter Z1 converts energy of an ambient energy source such as a solar panel and stores the energy in an energy storage. The second converter Z2 further converts the energy in the energy storage and outputs the converted energy to the load. Since the energy harvesting system uses two converters Z1, Z2, the power conversion loss is high, and the conversion efficiency is usually low. If each converter Z1, Z2 adopts an inductor L1, L2, the large size of the inductors will result in a bulky energy harvesting system.

FIG. 12A shows a power flow chart of another type of energy harvesting system having three converters Z1, Z2, Z3. The first converter Z1 converts the energy of the ambient energy source and supplies the converted energy to the load based on the load demand. The second converter Z2 transfers the surplus energy of the ambient energy source to the energy storage. The third converter Z3 converts the energy of the energy storage and supplies the energy to the load to cover deficiency of the ambient energy.

With reference to FIG. 12B, a single inductor multi-input multi-output (SIMIMO) energy harvesting system is proposed to implement the power flow of FIG. 12A. The SIMIMO energy harvesting system mainly comprises five power transistors S1-S5 and a single inductor L. The energy harvesting system adopts the time-division multiplexing (TDM) control and provides three converters Z1-Z3. Each of the converters Z1-Z3 can be implemented by the elements along a corresponding path shown in FIG. 12B. Comparing to the two-stage energy harvesting system, the number of inductors has been reduced to one. However, the SIMIMO energy harvesting system instead requires more power transistors S1-S2, S4-S5 as inductor-sharing switches to determine the input/output components of the single inductor that will cause extra switching loss and lower the power conversion efficiency.

SUMMARY OF THE INVENTION

The objective of the present invention is to provide an energy harvesting system using the least number of switches to deal with demanded and produced energy among an ambient energy source, an energy storage and a load. The energy harvesting system increases the overall conversion efficiency and also decreases production cost and area.

The energy harvesting system includes an energy storage, an ambient energy source, a power converting circuit and a control unit. When demanded power of a load is lower than a generated power of the ambient energy source, the control unit controls the power converting circuit to perform a charge mode in which a harvest operation and a recycle operation are alternately executed. The power converting circuit is configured to form a first converting circuit to transmit the ambient energy to the output capacitor during the harvest operation, and the power converting circuit is configured to form a second converting circuit to indirectly charge the energy storage during the recycle operation.

In accordance with one embodiment of the present invention, a power distribution method among an ambient energy source, an energy storage and a load side has the steps of:

determining whether the load side meets a first condition or a second condition;

when the load side meets the first condition, transmitting energy of the ambient energy source to the load side along a first direct power flowing path, and transmitting the energy to indirectly charge the energy storage through the load side along an indirect power flowing path; and when the load side meets the second condition, transmitting energy of the ambient energy source to the load side along the first direct power flowing path, and transmitting energy of the energy storage to the load side along a second direct power flowing path.

In accordance with another embodiment of the present invention, a power distribution method among an ambient energy source, an energy storage and a load side has the steps of:

determining whether the load side meets a first condition or a second condition;

when the load side meets the first condition, transmitting energy of the ambient energy source to the load side along a first direct power flowing path, and transmitting the energy to directly charge the energy storage along a direct power flowing path; and when the load side meets the second condition, transmitting energy of the ambient energy source to the load side along the first direct power flowing path, and transmitting energy of the energy storage to the load side along an indirect power flowing path.

Other objectives, advantages and novel features of the invention will become more apparent from the following detailed description when taken in conjunction with the accompanying drawings.

DETAILED DESCRIPTION OF THE PREFERRED EMBODIMENTS

Figure 12A:
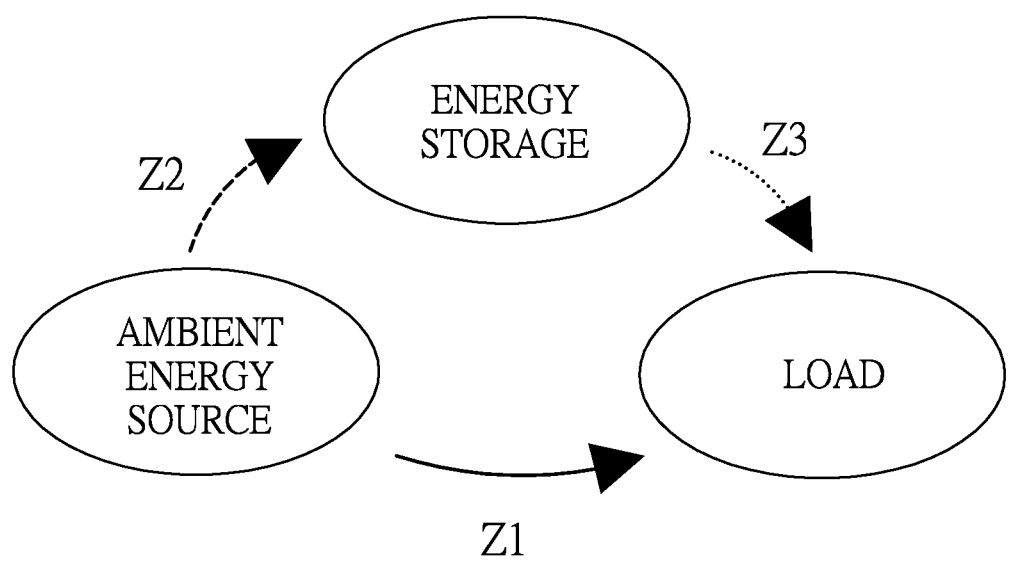
FIG. 12A shows a power flow schematic of a conventional single inductor dual-input dual-output (SIMIMO) energy harvesting system.
Figure 12B:
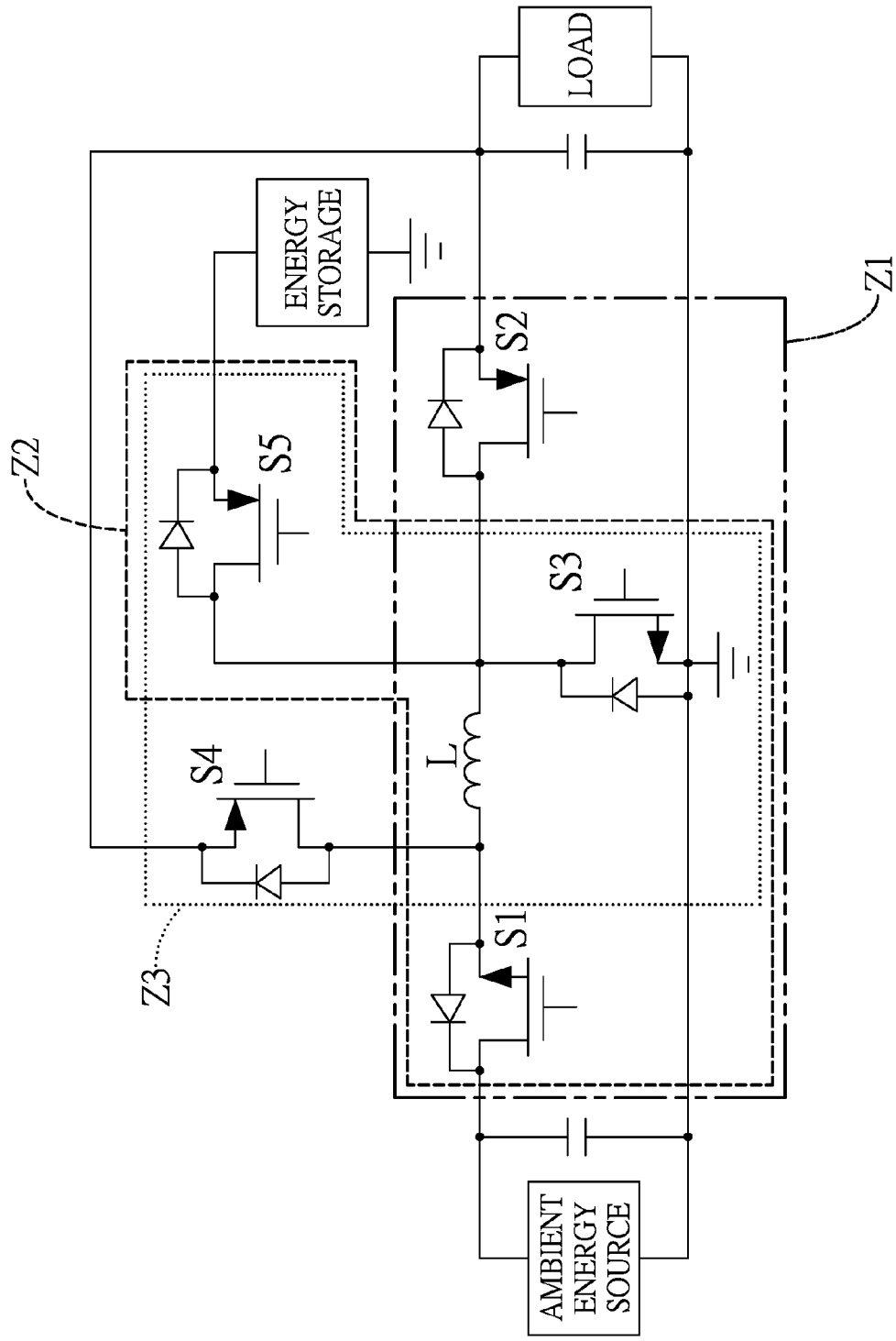
FIG. 12B shows a power flow chart of the conventional SIMIMO energy harvesting system.

An energy harvesting system usually requires three power flowing paths that include a first path from an ambient energy source to a load side, a second path from the ambient energy source to an energy storage, and a third path from the energy storage to the load side for balancing power distribution among them. Conventionally, a single inductor-based circuit as shown in FIG. 12B can provide the three power flowing paths to achieve the required function. However, such conventional inductor-based circuit needs too many inductor sharing switches to determine the input/output components of the single inductor for the different power flowing paths.

To solve the foregoing problem, an energy harvesting system in accordance with the present invention uses an indirect power flowing path. With the indirect power flowing path, one of the three original paths is omitted and the energy may be transmitted through any one of the ambient energy source, the energy storage and the load. For example, the original first path from the ambient energy source to the energy storage can be replaced with an indirect power flowing path from the ambient energy source, the load side to the energy storage.

Figure 1A:
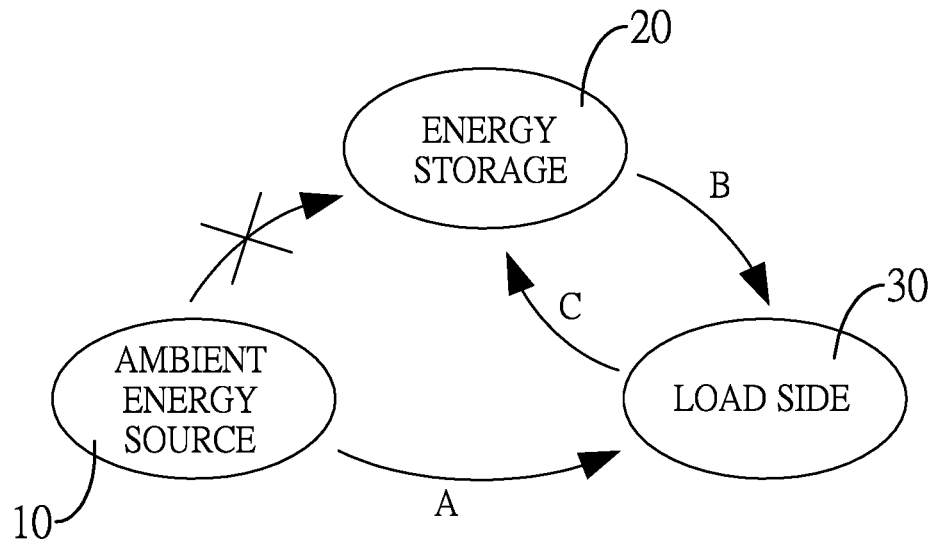
FIG. 1A is a power flow schematic in accordance with a first embodiment of an energy harvesting system.
Figure 1B:
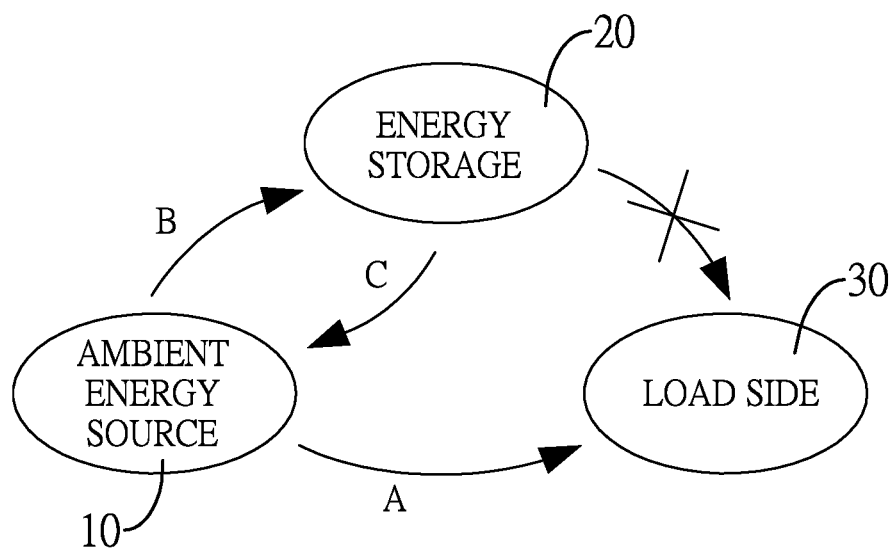
FIG. 1B is a power flow schematic in accordance with a second embodiment of an energy harvesting system.

With reference to FIGS. 1A and 1B, the indirect power transmission may be implemented by different ways. The first embodiment in FIG. 1A replaces the path from the ambient energy source 10 to the energy storage 20 with the indirect path from the ambient energy source 10, the load side 30 to the energy storage 20. The second embodiment in FIG. 1B replaces the path from the energy storage 20 to the load side 30 with the indirect path from the energy storage 20, the ambient energy source 10 to the load side 30.

For each embodiment mentioned above, the power converting or transmitting efficiency of the indirect path is relatively low as shown in the following table. Even though the efficiency of the indirect path is not high, an acceptable tradeoff between the overall conversion efficiency of the energy harvesting system and the efficiency of the indirect path is practicable if the indirect path has a lower importance or less used in the system.

| | Power flow | |
|---|---|---|
| Path | FIG. 1A | FIG. 1B |
| Ambient energy source→Load | High | High |
| Ambient energy source→Energy storage | Low | High |
| Energy storage→Load | High | Low |

With reference to FIG. 1A, the operation of an energy harvesting system in accordance with the first embodiment of the present invention can be expressed by the power flows A-C. When the ambient energy source 10 has no enough energy to satisfy the demand of a load, both the ambient energy source 10 and an energy storage 20 supply their energy to the load as shown by power flows A and B. When the generated energy of the ambient energy source 10 exceeds the demand of the load, the surplus energy of the ambient energy source 10 will be indirectly transferred to and stored in the energy storage 20 as shown by the power flows A and C. It is noted that the power flows B and C can be implemented by a single converter circuit with bidirectional power transmissions, and another power flow A can be implemented by another converter circuit.

With reference to FIG. 1B, the operation of the energy harvesting system in accordance with another embodiment of the present invention can be expressed by the power flows A-C. When the generated energy of the ambient energy source 10 exceeds the demand of the load side 30, both the load side 30 and the energy storage 20 obtain the energy from the ambient energy source 10 as shown by power flows A and B. When the ambient energy source 10 has no enough energy to satisfy the demand of the load side 30, the insufficient energy of the ambient energy source 10 will be indirectly supplied from the energy storage 20 as shown by the power flows C and A. The power flows B and C can be implemented by a single converter circuit with bidirectional power transmissions, and another power flow A can be implemented by another converter circuit.

Figure 2A:
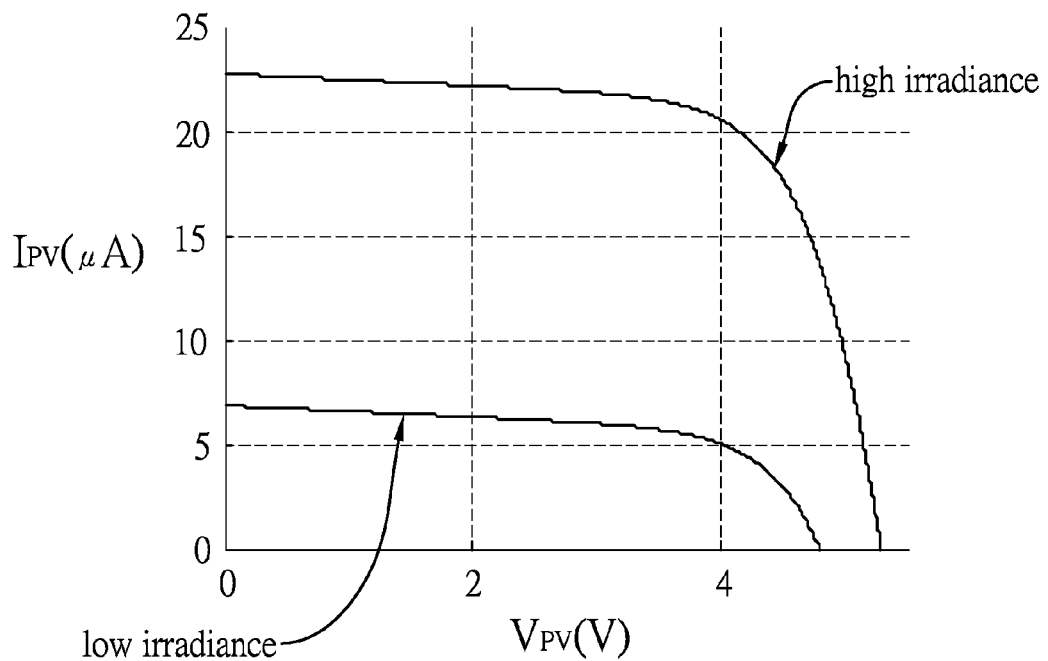
FIG. 2A shows output current-output voltage curves of a solar panel under different irradiances.
Figure 2B:
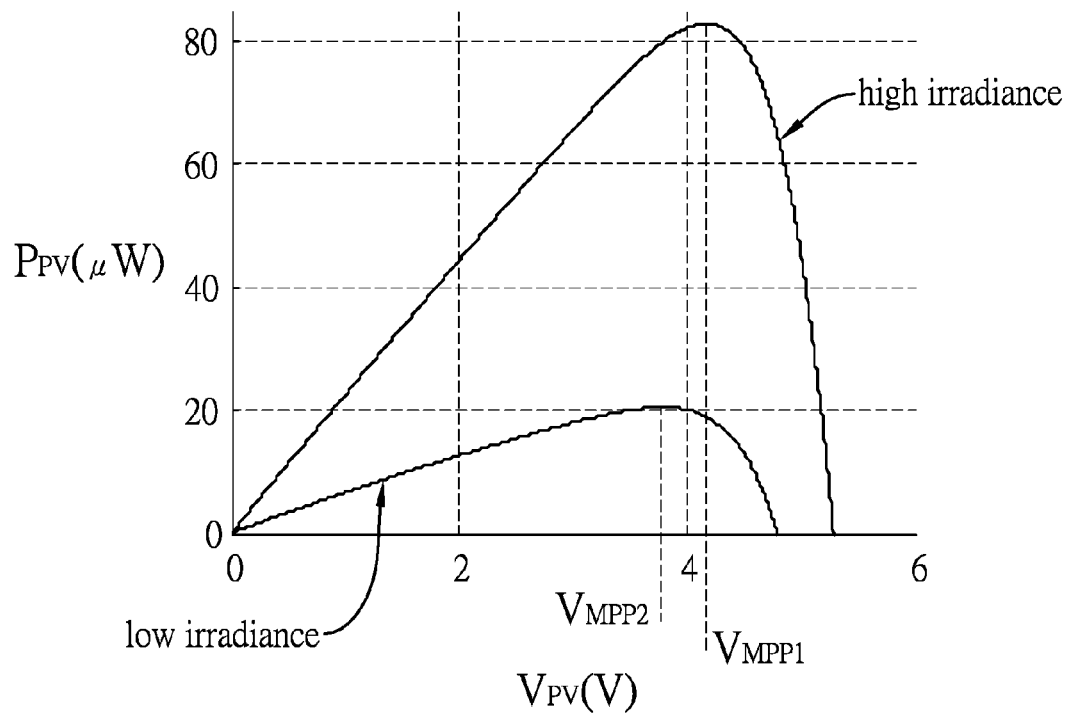
FIG. 2B shows output power-output voltage curves of a solar panel under different irradiances.

In the present invention, the ambient energy source 10 is a solar panel for converting light energy to electricity energy. However, other kinds of the ambient energy source 10 are practicable. With reference to FIG. 2A as an example, the relationship between the output currents ($I_{PV}$) and the output voltages ($V_{PV}$) of a solar panel can be expressed by such non-linear curves, wherein the two curves are measured under different light intensity (lux). Based on the relationships, the output power ($P_{PV}$) curves of the solar panel can be illustrated as shown in FIG. 2B. If the output voltage ($V_{PV}$) of the solar panel is controlled at a maximum power voltage $V_{MPP1}$ or $V_{MPP2}$, which corresponds to the peak of the curve, the output power ($P_{PV}$) can be maintained at a maximum value, i.e. the maximum output power point.

Figure 3A:
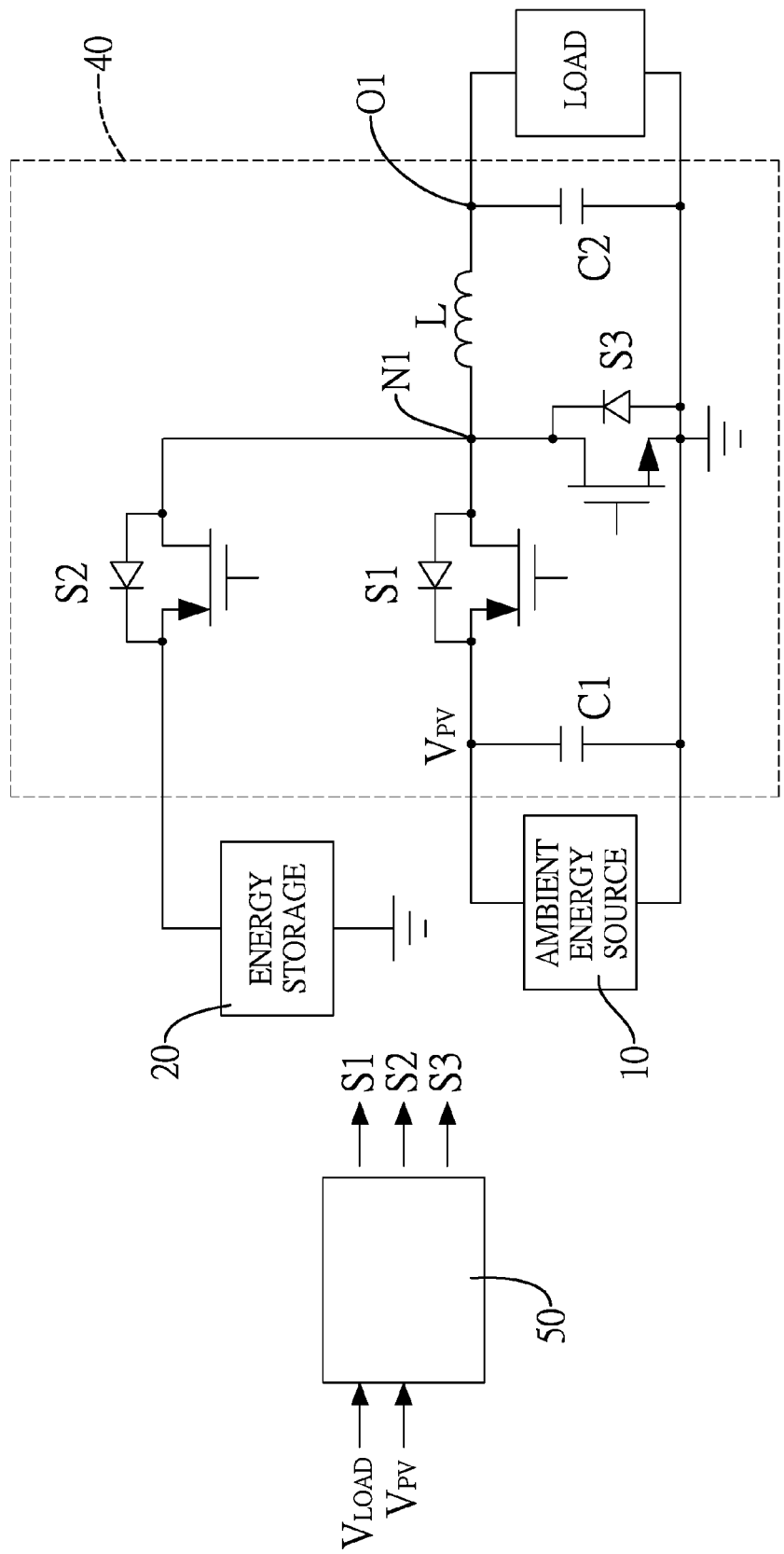
FIG. 3A is a circuit diagram of an energy harvesting system of the present invention for implementing power flow of FIG. 1A.
Figure 3B:
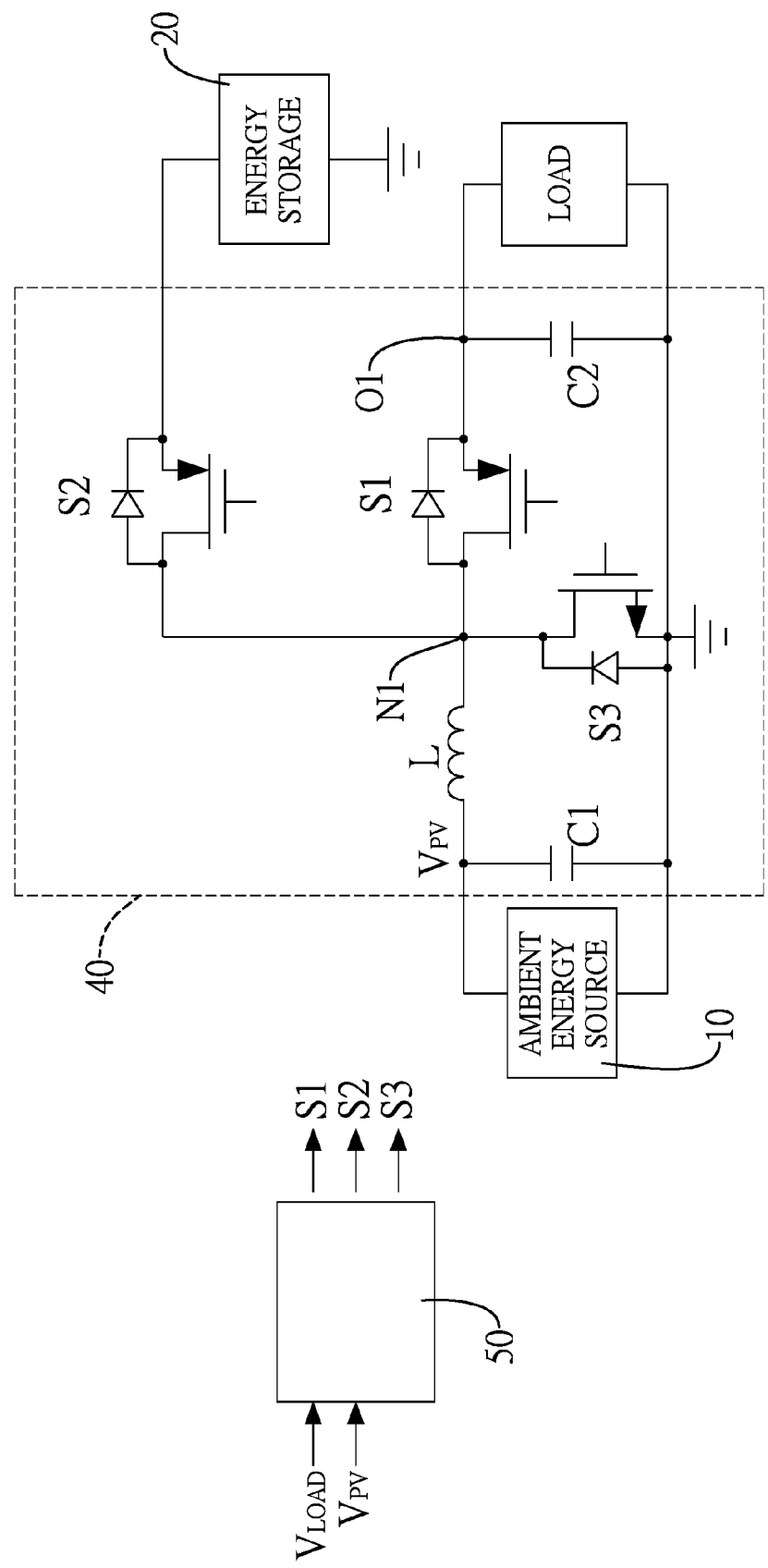
FIG. 3B is a circuit diagram of an energy harvesting system of the present invention for implementing power flow of FIG. 1B of the present invention.

With reference to FIG. 3A, the power flows of FIG. 1A can be implemented by the energy harvesting system comprising a solar panel as the ambient energy source 10, a secondary battery as the energy storage 20, a power converting circuit 40 and a control unit 50. The power converting circuit 40 includes three power transistors as first to third switches S1-S3, an input capacitor C1, an inductor L, and an output capacitor (load capacitor) C2. With reference to FIG. 3B, the energy harvesting system applied to implement the power flows of FIG. 1B has a circuit configuration similar to FIG. 3A.

In FIG. 3A, the input capacitor C1 is connected in parallel to the ambient energy source 10. The first switch S1 is connected between the ambient energy source 10 and a common node N1. The second switch S2 is connected between the energy storage 20 and the common node N1. The third switch S3 is connected between the common node N1 and the ground. The inductor L is connected between the common node N1 and an output node O1. The output capacitor C2 is connected between the output node O1 and the ground. The load can be connected to the output node O1, wherein the load in this embodiment is a wireless signal transceiver.

In the control unit 50, a maximum power voltage $V_{MPP}$, a low threshold of the output voltage $V_{L-LOAD}$, and a high threshold of the output voltage $V_{H-LOAD}$ are set therein. The maximum power voltage $V_{MPP}$ corresponds to the maximum output power of the solar panel. The low threshold and the high threshold $V_{L-LOAD}$, $V_{H-LOAD}$ commonly determine a required range of the output voltage $V_{LOAD}$ of the energy harvesting system, wherein the output voltage $V_{LOAD}$ is measured across the output capacitor C2. The control unit 50 further acquires some sensed voltage information including an output voltage $V_{PV}$ of the solar panel, and the output voltage $V_{LOAD}$ supplied to the load. According to the sensed voltage information, the control unit 50 generates different driving signals to turn on/off the switches S1-S3 and controls them to perform a harvest operation, a backup operation or a recycle operation.

Harvest Operation

Figure 4A:
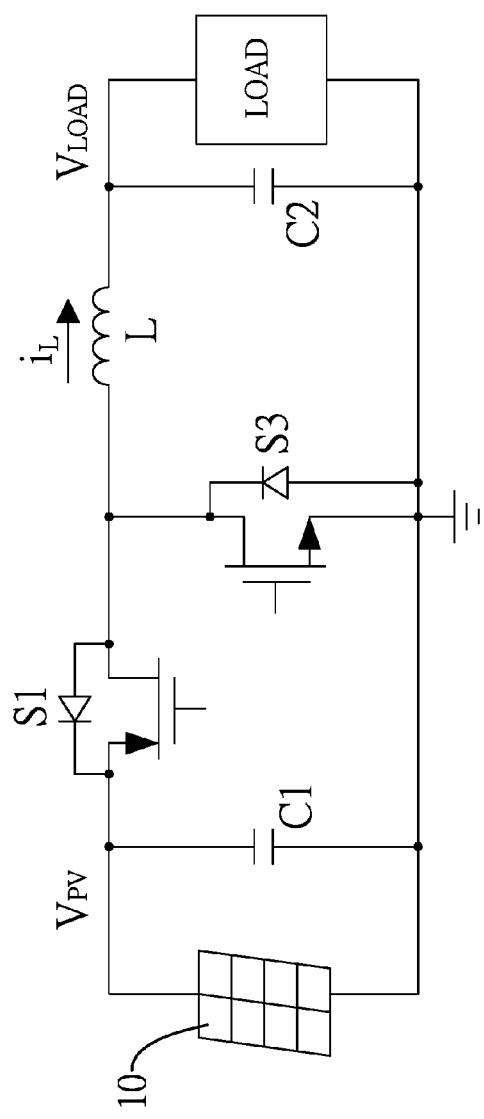
FIG. 4A shows the harvest operation of the energy harvesting system of FIG. 3A of the present invention.
Figure 4B:
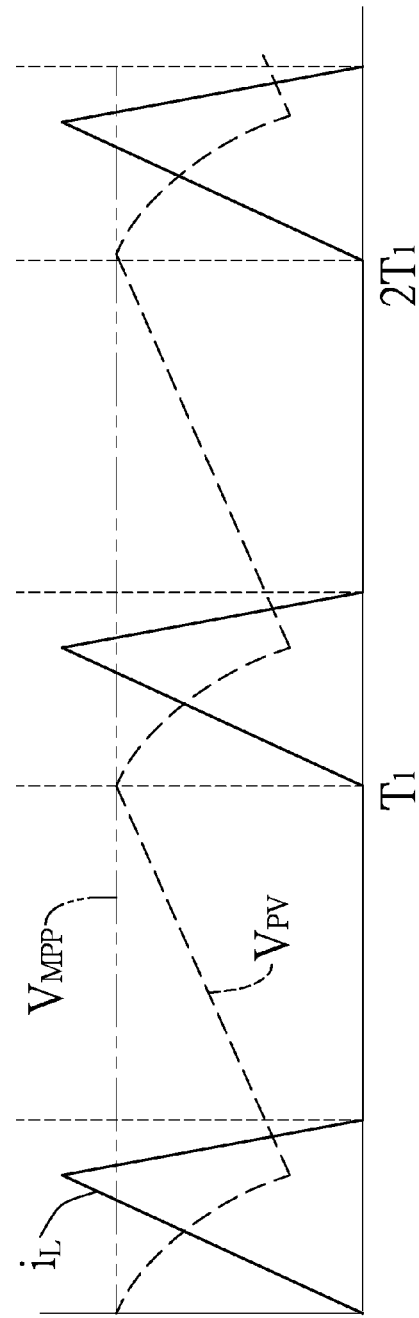
FIG. 4B shows waveforms of the inductor current and the output voltages ($V_{PV}$) of the solar panel under the harvest operation.

With reference to FIGS. 4A and 4B, when the output voltage $V_{PV}$ of the solar panel is higher than the maximum power voltage $V_{MPP}$, ($V_{PV}>V_{MPP}$), the input capacitor C1 accumulates enough energy so that the energy harvesting system performs the harvest operation. The control unit 50 disables the second switch S2, and alternately turns on and off the first switch S1 and the third switch S3. In each switching cycle, after the first switch S1 has been turned on and off, the third switch S3 is subsequently activated. Thus, the input capacitor C1, the first switch S1, the third switch S3, the inductor L and the output capacitor C2 form a buck converter. When the buck converter operates, it regulates the output voltage $V_{PV}$ of the solar panel 10 to not exceed the maximum power voltage $V_{MPP}$. In other words, the solar panel can be operated near the maximum output power point and produce as much output power as possible.

Backup Operation

Figure 5A:
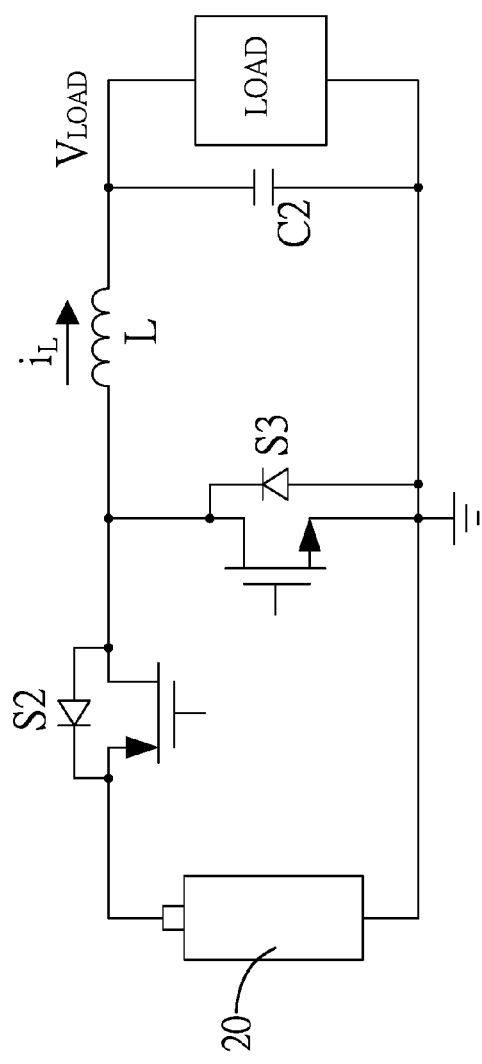
FIG. 5A shows the backup operation of the energy harvesting system of FIG. 3A of the present invention.
Figure 5B:
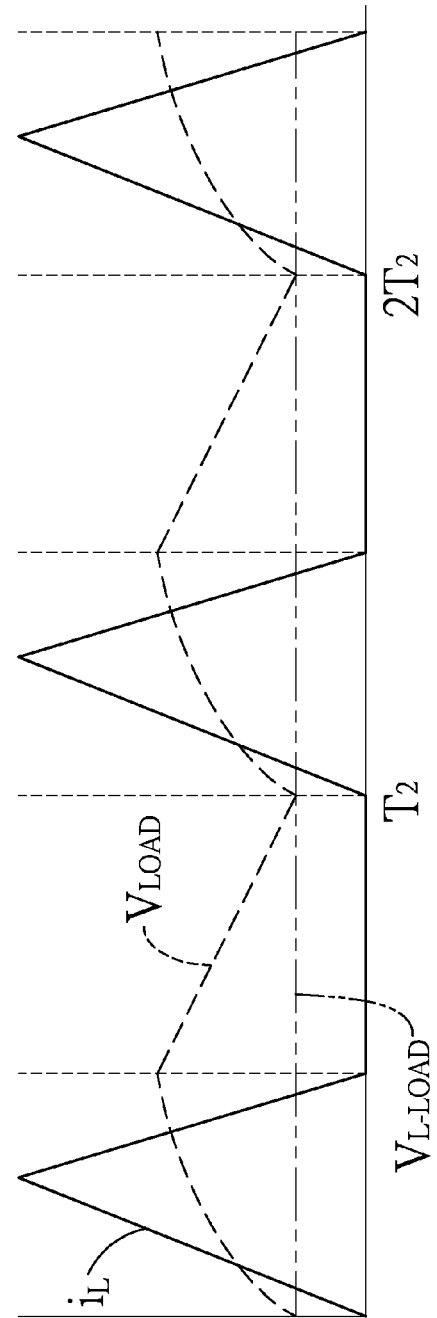
FIG. 5B shows waveforms of the inductor current and the output voltages ($V_{LOAD}$) of the energy harvesting system under the backup operation.

With reference to FIGS. 5A and 5B, when the output voltage $V_{LOAD}$ across the output capacitor C2 is lower than the low threshold $V_{L-LOAD}$, ($V_{LOAD}<V_{L-LOAD}$), the output capacitor C2 obtains insufficient energy so that the energy harvesting system perform the backup operation. The control unit 50 disables the first switch S1, and alternately turns on and off the second switch S2 and the third switch S3. In each switching cycle, after the second switch S2 has been turned on and off, the third switch S3 is subsequently activated. Thus, the second switch S2, the third switch S3, the inductor L and the output capacitor C2 form a buck converter. When the buck converter operates, it draws energy from the secondary battery and supplies the energy to the load. Therefore, the output voltage $V_{LOAD}$ across the output capacitor C2 increases its level and maintains to be not lower than the low threshold $V_{L-LOAD}$ as shown in FIG. 5B.

Recycle Operation

Figure 6A:
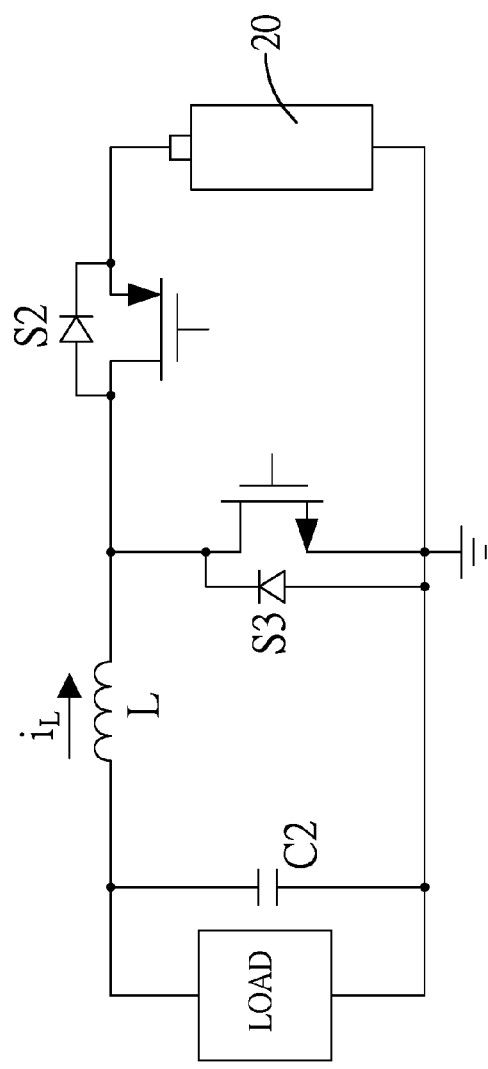
FIG. 6A shows the recycle operation of the energy harvesting system of FIG. 3A of the present invention.
Figure 6B:
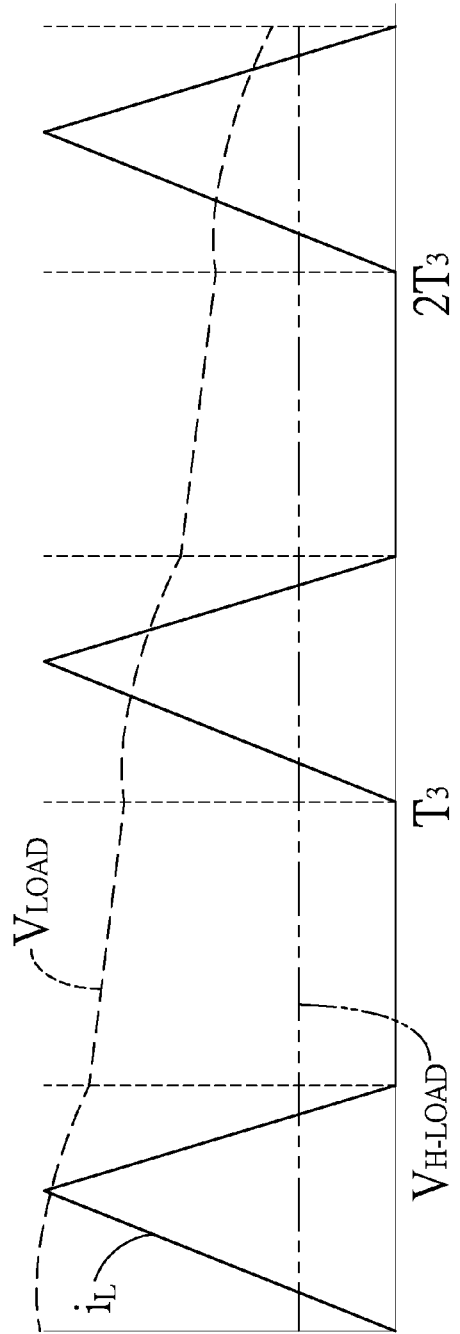
FIG. 6B shows waveforms of the inductor current and the output voltages ($V_{LOAD}$) of the energy harvesting system under the recycle operation.

With reference to FIGS. 6A and 6B, when the output voltage $V_{LOAD}$ across the output capacitor C2 is higher than the high threshold $V_{H-LOAD}$, ($V_{LOAD}>V_{H-LOAD}$), the output capacitor C2 obtains excess energy so that the energy harvesting system performs the recycle operation. The control unit 50 disables the first switch S1, and alternately turns on and off the third switch S3 and the second switch S2. In each switching cycle, after the third switch S3 has been turned on and off, the second switch S2 is subsequently activated. Thus, the second switch S2, the third switch S3, the inductor L and the output capacitor C2 form a boost converter. When the boost converter operates, the secondary battery is charged to store the excess energy. Therefore, the output voltage $V_{LOAD}$ across the output capacitor C2 gradually decreases its level, and eventually maintains to be not higher than the high threshold $V_{H-LOAD}$ as shown in FIG. 6B.

Figure 3C:
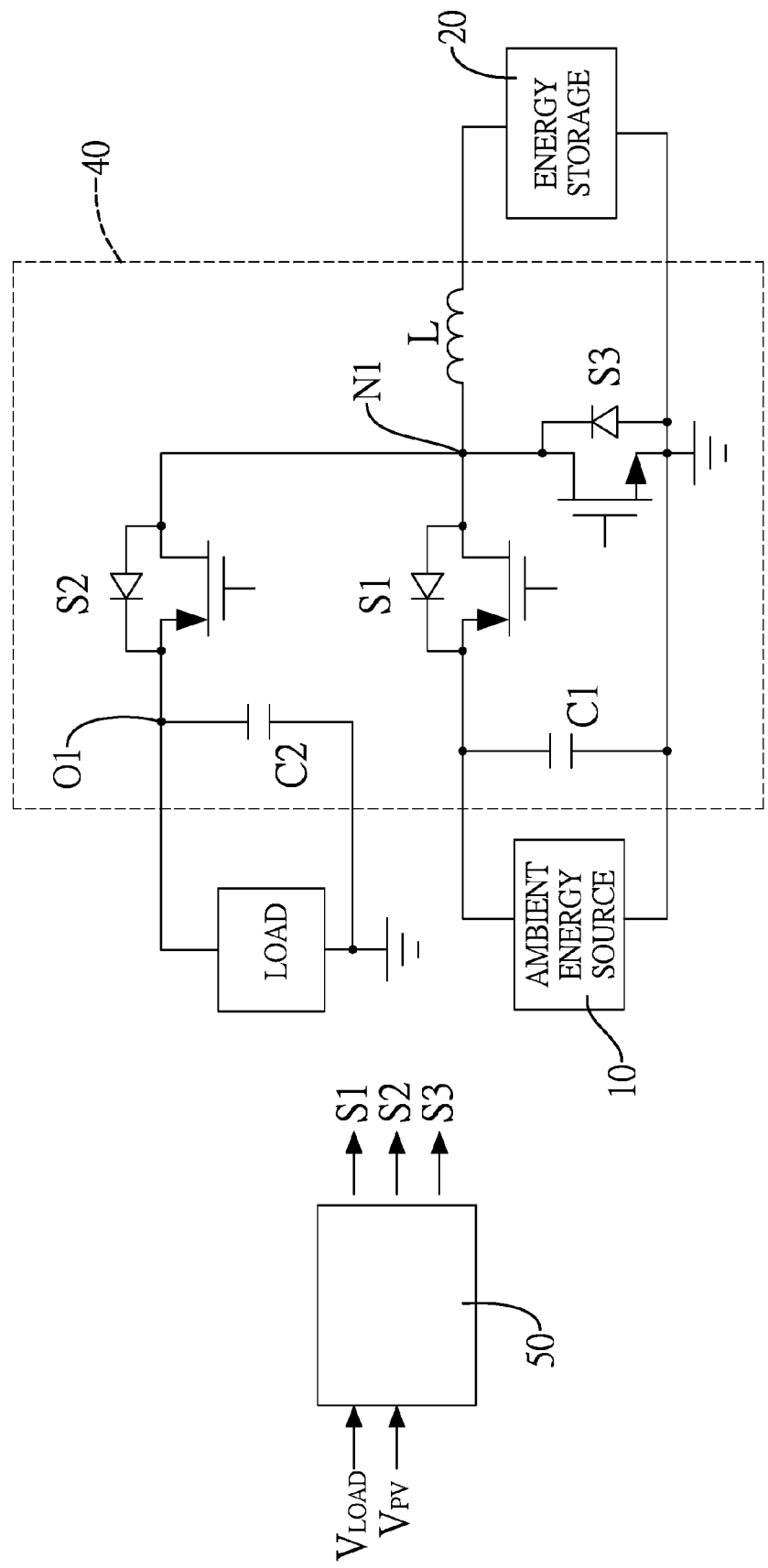
FIG. 3C is a circuit diagram of an energy harvesting system of the present invention for implementing power flow of FIG. 11A.
Figure 11A:
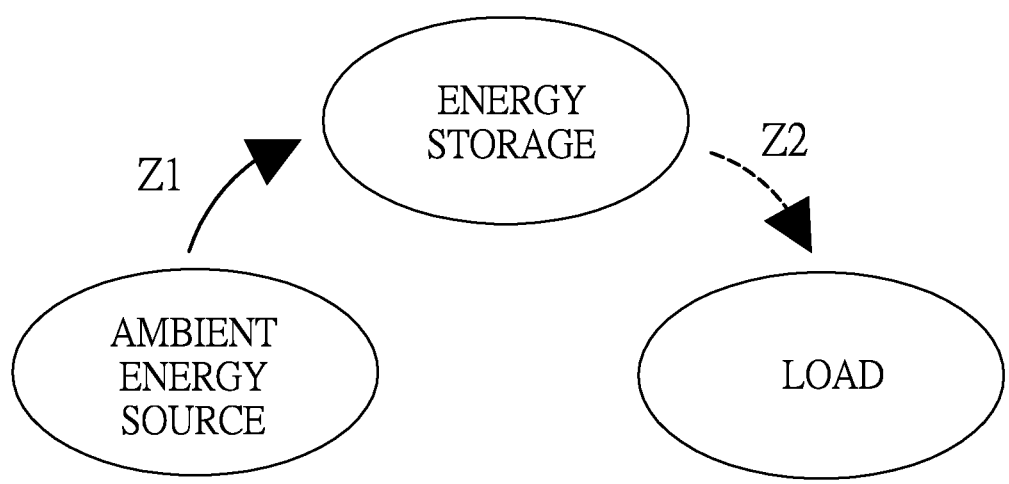
FIG. 11A shows a power flow schematic of a two-stage conventional DC to DC energy harvesting system.
Figure 11B:
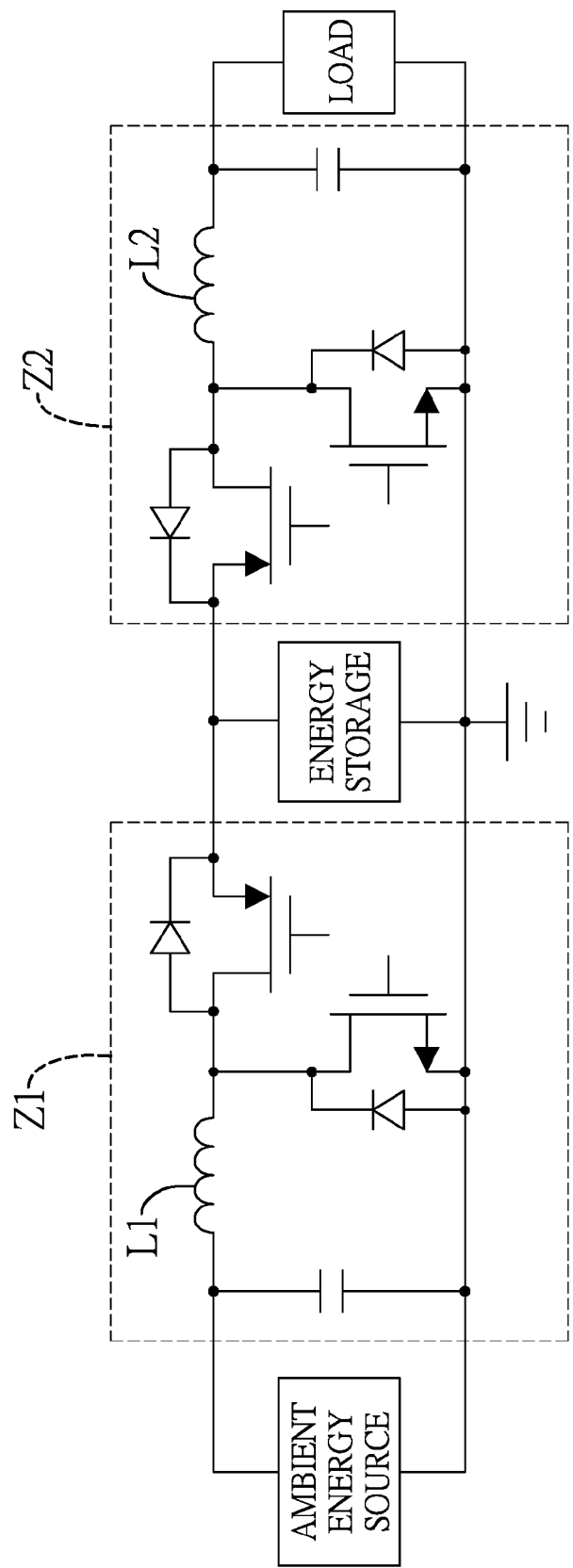
FIG. 11B shows a circuit diagram of a conventional two-stage DC to DC energy harvesting system.

With reference to FIG. 3C, the energy harvesting system applied to implement the power flows of FIG. 11A has a circuit configuration similar to FIG. 3A and FIG. 3B.

In FIG. 3C, the input capacitor C1 is connected in parallel to the ambient energy source 10. The first switch S1 is connected between the ambient energy source 10 and a common node N1. The second switch S2 is connected between the output node O1 and the common node N1. The third switch S3 is connected between the common node N1 and the ground. The inductor L is connected between the common node N1 and an energy storage 20. The output capacitor C2 is connected between the output node O1 and the ground. The load can be connected to the output node O1, wherein the load in this embodiment is a wireless signal transceiver.

In the control unit 50, a maximum power voltage $V_{MPP}$, a low threshold of the output voltage $V_{L-LOAD}$, and a high threshold of the output voltage $V_{H-LOAD}$ are set therein. The maximum power voltage $V_{MPP}$ corresponds to the maximum output power of the solar panel. The low threshold and the high threshold $V_{L-LOAD}$, $V_{H-LOAD}$ commonly determine a required range of the output voltage $V_{LOAD}$ of the energy harvesting system, wherein the output voltage $V_{LOAD}$ is measured across the output capacitor C2. The control unit 50 further acquires some sensed voltage information including an output voltage $V_{PV}$ of the solar panel, and the output voltage $V_{LOAD}$ supplied to the load. According to the sensed voltage information, the control unit 50 generates different driving signals to turn on/off the switches S1-S3 and controls them to perform a harvest operation or a supply operation.

Harvest Operation

Figure 7A:
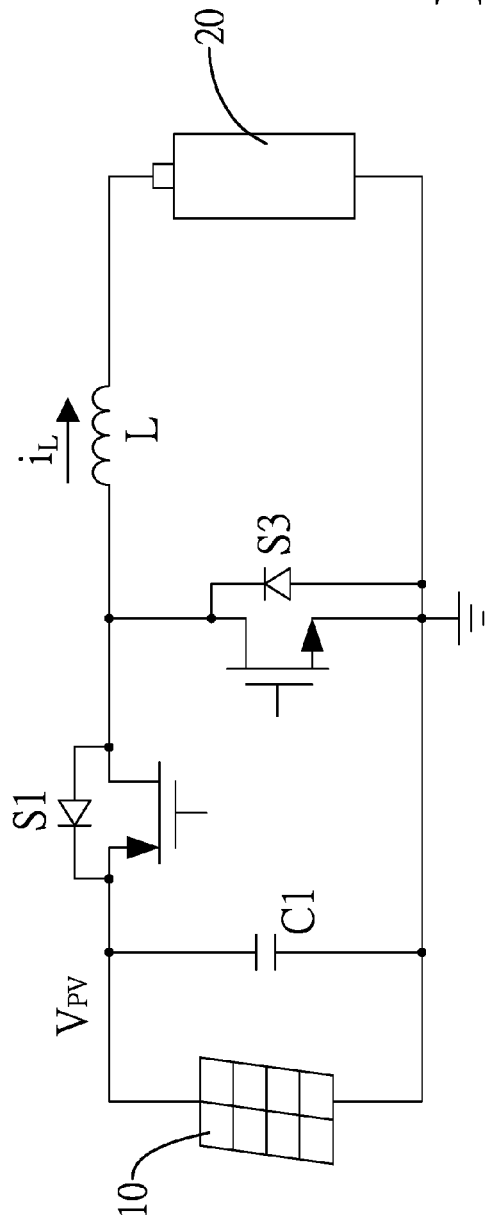
FIG. 7A shows the harvest operation of the energy harvesting system of FIG. 3C of the present invention.
Figure 7B:
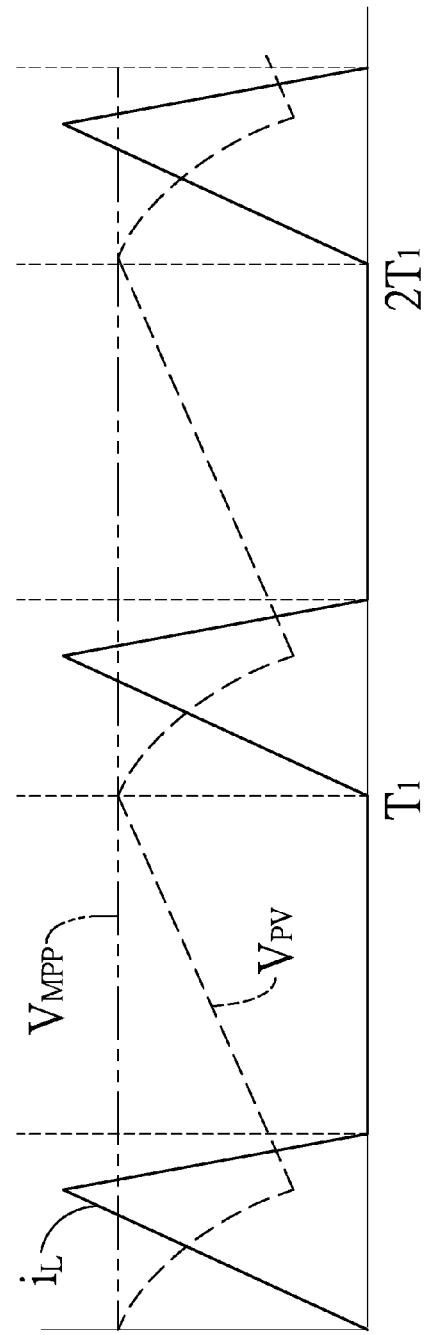
FIG. 7B shows waveforms of the inductor current and the output voltages ($V_{PV}$) of the solar panel under the harvest operation.

With reference to FIGS. 7A and 7B, when the output voltage $V_{PV}$ of the solar panel is higher than the maximum power voltage $V_{MPP}$, ($V_{PV}>V_{MPP}$), the input capacitor C1 accumulates enough energy so that the energy harvesting system performs the harvest operation. The control unit 50 disables the second switch S2, and alternately turns on and off the first switch S1 and the third switch S3. In each switching cycle, after the first switch S1 has been turned on and off, the third switch S3 is subsequently activated. Thus, the input capacitor C1, the first switch S1, the third switch S3, the inductor L and the energy storage 20 form a buck converter. When the buck converter operates, it regulates the output voltage $V_{PV}$ of the solar panel 10 to not exceed the maximum power voltage $V_{MPP}$. In other words, the solar panel can be operated near the maximum output power point and produce as much output power as possible.

Supply Operation

Figure 8A:
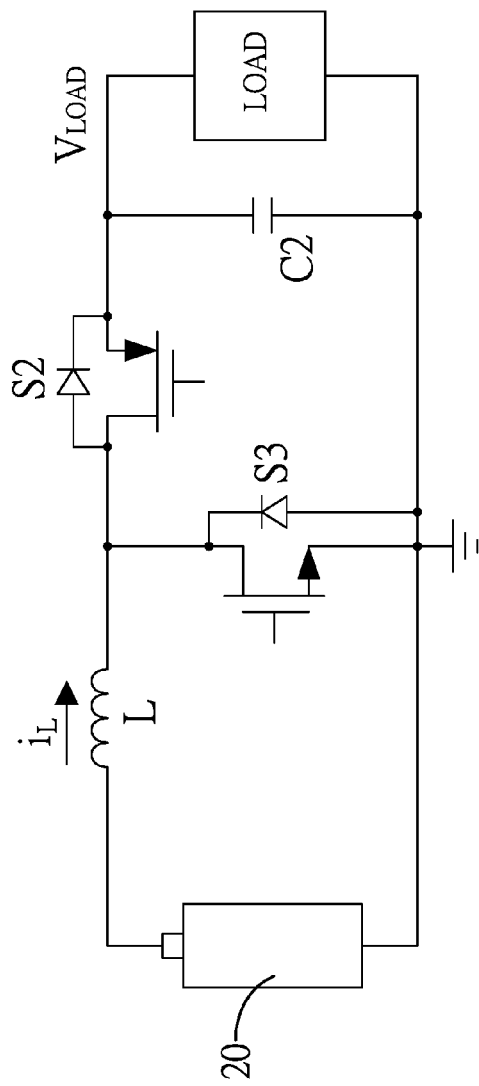
FIG. 8A shows the supply operation of the energy harvesting system of FIG. 3C of the present invention.
Figure 8B:
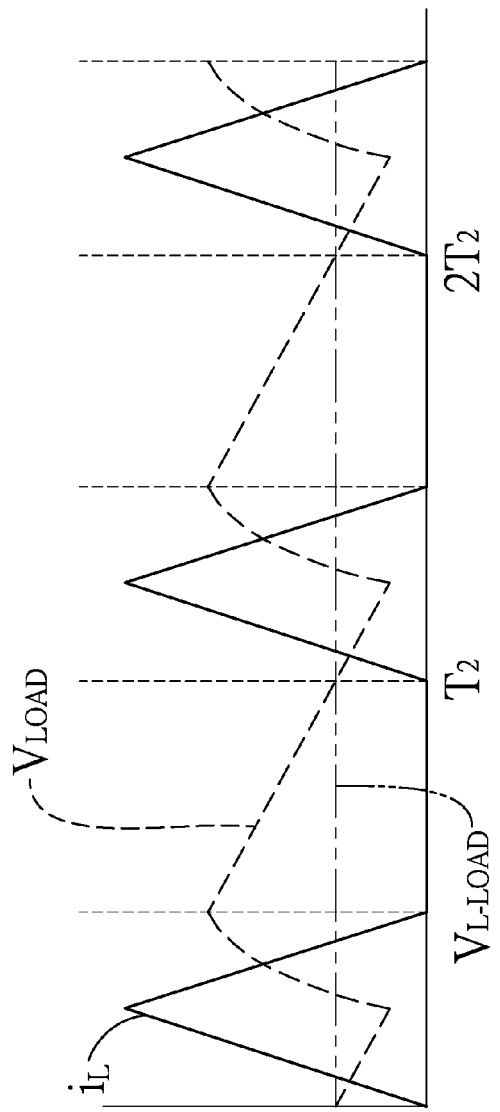
FIG. 8B shows waveforms of the inductor current and the output voltages ($V_{LOAD}$) of the energy harvesting system under the supply operation.

With reference to FIGS. 8A and 8B, when the output voltage $V_{LOAD}$ across the output capacitor C2 is lower than the low threshold $V_{L\text{-}LOAD}$, ($V_{LOAD}<V_{L\text{-}LOAD}$), the output capacitor C2 obtains insufficient energy so that the energy harvesting system perform the supply operation. The control unit 50 disables the first switch S1, and alternately turns on and off the third switch S3 and the second switch S2. In each switching cycle, after the third switch S3 has been turned on and off, the second switch S2 is subsequently activated. Thus, the third switch S3, the second switch S2, the inductor L and the output capacitor C2 form a boost converter. When the boost converter operates, it draws energy from the secondary battery and supplies the energy to the load. Therefore, the output voltage $V_{LOAD}$ across the output capacitor C2 increases its level and maintains to be not lower than the low threshold $V_{L\text{-}LOAD}$ as shown in FIG. 8B.

Figure 9:
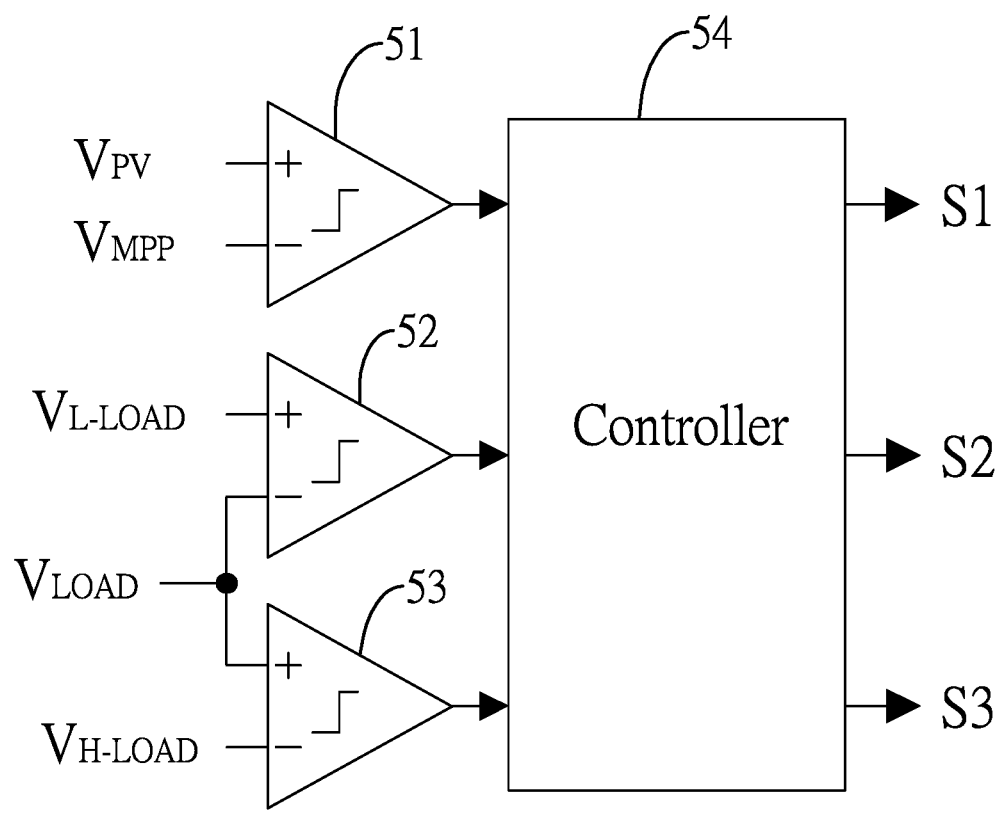
FIG. 9 is a circuit block diagram of the control unit of the of the energy harvesting system.
Figure 10:
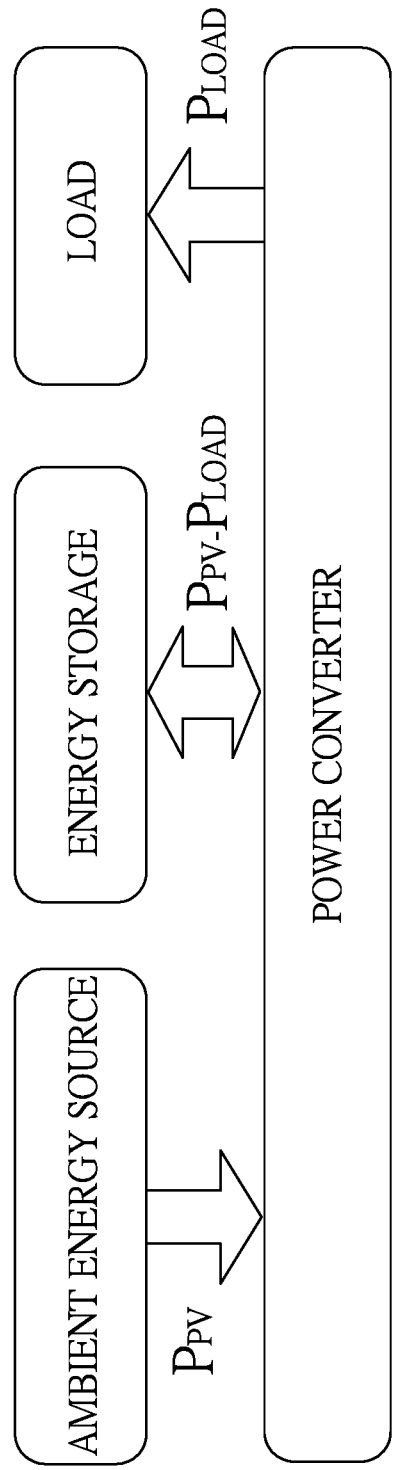
FIG. 10 shows a conventional energy harvesting system.

With reference to FIG. 9, the control unit 50 may comprise a first comparator 51, a second comparator 52, a third comparator 53, and a controller 54. The first comparator 51 receives the sensed output voltage $V_{PV}$ of the solar panel and compares it with the maximum power voltage $V_{MPP}$. The controller 54 based on the comparison result of the first comparator 51 generates driving signals for controlling the first switch S1 and the third switch S3 to execute the harvest operation.

The second comparator 52 receives the sensed output voltage $V_{LOAD}$ across the output capacitor C2 and compares it with the low threshold $V_{L\text{-}LOAD}$. The controller 54 based on the comparison result of the second comparator 52 generates driving signals for controlling the second switch S2 and the third switch S3 to execute the backup operation or supply operation.

The third comparator 53 receives the sensed output voltage $V_{LOAD}$ across the output capacitor C2 and compares it with the high threshold $V_{H\text{-}LOAD}$. The controller 54 based on the comparison result of the third comparator 53 generates driving signals for controlling the second switch S2 and the third switch S3 to operate under the recycle operation.

In practical application, the power converting circuit 40 may be operated in a charge mode or a discharge mode based on the statuses of the load. In this embodiment, a wireless transceiver is used as the load and the solar panel is unable to provide sufficient power to the wireless transceiver while it is transmitting data. Thus, the power converting circuit 40 operates in the discharge mode when the wireless transceiver transmits or receives data. In the discharge mode, the inductor L is operated in a discontinuous-conduction mode (DCM), and the power converting circuit 40 alternately performs the above-mentioned harvest operation and the backup operation to implement the power flows A and B of FIG. 1A. The secondary battery supplies its energy to the wireless transceiver to compensate the energy insufficiency of the solar panel.

When the wireless transceiver is lying idle, the solar panel may produce excess energy. The generated power of the solar panel is greater than demanded power of the wireless transceiver. The power converting circuit 40 will be operated in the charge mode. The inductor L is also operated in a discontinuous-conduction mode (DCM). However, the power converting circuit 40 alternately performs the above-mentioned harvest operation and the recycle operation to implement the power flows A and C of FIG. 1A. The secondary battery is charged by the output capacitor C2 to recycle the excess energy of the solar panel.

In the present invention, a novel energy harvesting system architecture and a power distribution method are proposed to deal with demanded and produced energy among the ambient energy source, the energy storage and the load side. Compared to the conventional system, the invention achieves the function of power distribution with the least number of switches S1-S3, increases the overall conversion efficiency, and also decreases production cost and area.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An energy harvesting system comprising:
    an energy storage;
    an ambient energy source supplying ambient energy;
    a power converting circuit comprising
        an input capacitor connected in parallel to the ambient energy source;
        a first switch connected between the ambient energy source and a common node;
        a second switch connected between the common node and an output node, wherein the output node is used for connecting to a load; and
        an output capacitor connected between the output node and the ground;
        a third switch connected between the common node and a ground;
        a single inductor connected between the common node and the energy storage;
    a control unit connected to the power converting circuit and controls the power converting circuit to perform a harvest operation or a supply operation;
    wherein
    when the power converting circuit is configured to form a voltage buck converter to transmit the ambient energy to charge energy storage during the harvest operation, the second switch is disabled, the first switch and the third switch are alternately turned on and off, and in each switching cycle, after the first switch has been turned on and off, the third switch is subsequently activated; and when the power converting circuit is configured to form a voltage boost converter to transmit the stored energy in the energy storage to the output capacitor to discharge the energy storage during the supply operation, the first switch is disabled, the second switch and the third switch are alternately turned on and off, and in each switching cycle, after the third switch has been turned on and off, the second switch is subsequently activated.

2. The system as claimed in claim 1, wherein the control unit receives sensed voltage information including an output voltage of the ambient energy source and an output voltage of the output capacitor;

when the control unit determines that the output voltage of the ambient energy source is higher than a maximum power voltage, the power converting circuit performs the harvest operation;

when the control unit determines that the output voltage of the output capacitor is lower than a low threshold, the power converting circuit performs the supply operation to increase the output voltage across the output capacitor.

3. The system as claimed in claim 2, wherein the ambient energy source is a solar panel, and the energy storage is a secondary battery.

* * * * *